United States Patent [19]

Feinberg

[11] Patent Number: 5,745,155
[45] Date of Patent: Apr. 28, 1998

[54] SCAN UNIFORMITY CORRECTION

[75] Inventor: Amatzia Feinberg, Los Angeles, Calif.

[73] Assignee: Xerox Corporation, Stamford, Conn.

[21] Appl. No.: 908,201

[22] Filed: Jul. 2, 1992

[51] Int. Cl.$^6$ ........................................................ B41J 2/47
[52] U.S. Cl. ................................................ 347/256; 347/134
[58] Field of Search .................................. 346/108, 76 L, 346/1.1, 107 R, 160, 150; 358/296, 300, 302; 347/251, 256, 134

[56] References Cited

U.S. PATENT DOCUMENTS 4,920,364  4/1990  Andrews et al. .................. 346/150

*Primary Examiner*—Mark J. Reinhart
*Attorney, Agent, or Firm*—Fariba Rad

[57] ABSTRACT

A raster output scanner (ROS) with a liquid crystal window located at the output of the ROS for correcting the nonuniformity of a light beam generated by the ROS is disclosed. Since the photocells in the liquid crystal can be controlled individually, a variable attenuation to match the curve of the intensity of the light beam, generated by the ROS, can be applied to the light beam. When the light beam with a variable intensity passes through the liquid crystal window of this invention, each cell applies an attenuation to offset the variation in intensity of the light received by that cell. Therefore, the light beam emerging from the liquid crystal window will have a uniform intensity regardless of the variation of the intensity generated by the ROS.

10 Claims, 5 Drawing Sheets

SCAN UNIFORMITY CORRECTION

BACKGROUND OF THE INVENTION

This invention relates to a scan uniformity correction for a raster output scanner.

A conventional raster output scanner utilizes a light source, a modulator and a multi-faceted rotating polygon mirror as the scanning element. The light source, which can be a laser source, produces a light beam and sends it to the modulator. The modulator receives pixel information for modulating the light beam. The modulated light beam will be directed onto a rotating polygon. At the strike of the modulated light beam, the rotating polygon reflects the modulated light beam and causes the reflected light beam to revolve about an axis near the center of rotation of the rotating polygon and scan a straight line. This reflected light beam can be utilized to scan a document at the input of an imaging system or can be used to impinge upon a photographic film or a photosensitive medium, such as a xerographic drum at the output of the imaging system.

Many of the conventional ROSs exhibit a modulated light beam which has a varying intensity over one scan line. For instance, the modulated light beam at the start of the scan line and at the end of the scan line has less intensity than at the center of the scan line. If the intensity variation (difference between the highest intensity and the lowest intensity) becomes more than a certain percentage of the lowest intensity (for example 12%), it can be observed on the printed document as lighter prints at the edges of the document and as darker prints at the center of the document. The problem comes mainly from the modulator since the light beam entering the modulator has a uniform intensity over each scan line. The ROS optics also contribute to the problem since they exhibit varying efficiencies as a function of an incoming beam angle.

Each modulator generates a different intensity variation. For production purposes, if the intensity variation of the modulator is less than a certain percentage of the lowest intensity (for example 12%), it can be used in a raster optical scanner. However, if the intensity variation of the modulator is more than the aforementioned certain percentage of the lowest intensity (for example 12%), the modulator will be rejected.

SUMMARY OF THE INVENTION

In accordance with one aspect of this invention, the nonuniformity of the modulated light beam, in the raster output scanner, is corrected. The raster output scanner of this invention has a liquid crystal window placed at the output end of the scanner. By adjusting attenuation of each individual cell on the liquid crystal window, the intensity of the light beam coming from any modulator used in each raster output scanner, can be corrected.

The attenuation of the modulated light beam can be adjusted in various areas over each scan line by utilizing the properties of the liquid crystal window. By controlling each individual cell of the liquid crystal window, different levels of attenuation can be generated to match the curve of the intensity of the light beam, generated by the ROS When the light beam with a variable intensity passes through the liquid crystal window of this invention, each cell applies an attenuation to offset the variation in intensity of the light beam received by that cell in order to generate a light beam with a uniform intensity. The liquid crystal window is placed down stream of a beam scanning mechanism to correct any nonuniformity which is caused by a modulator and scanning optics. Since the beam intensity may vary from ROS to ROS, the attenuation in each liquid crystal window can be adjusted to meet the required correction for any beam intensity variation generated by the raster output scanner. Since the variation in beam intensity is primarily caused by the modulators, this scheme allows modulators, which would otherwise be rejected, to be used in the raster output scanners. Also, the printed image uniformity is improved.

In accordance with another aspect of this invention, the liquid crystal window reduces the intensity variation of the modulated light beam by attenuating the modulated light beam only at the vicinity of the center of the scan which has the highest intensity. By reducing the nonuniformity of the intensity curve only at the vicinity of the peak of the curve and keeping the intensity of the modulated light beam at the start of scan and end of scan intact, the intensity variation will be reduced. Again, using this scheme, allows modulators, which would otherwise be rejected, to be used in the raster output scanners.

DESCRIPTION OF THE PREFERRED EMBODIMENT

Figure 1:
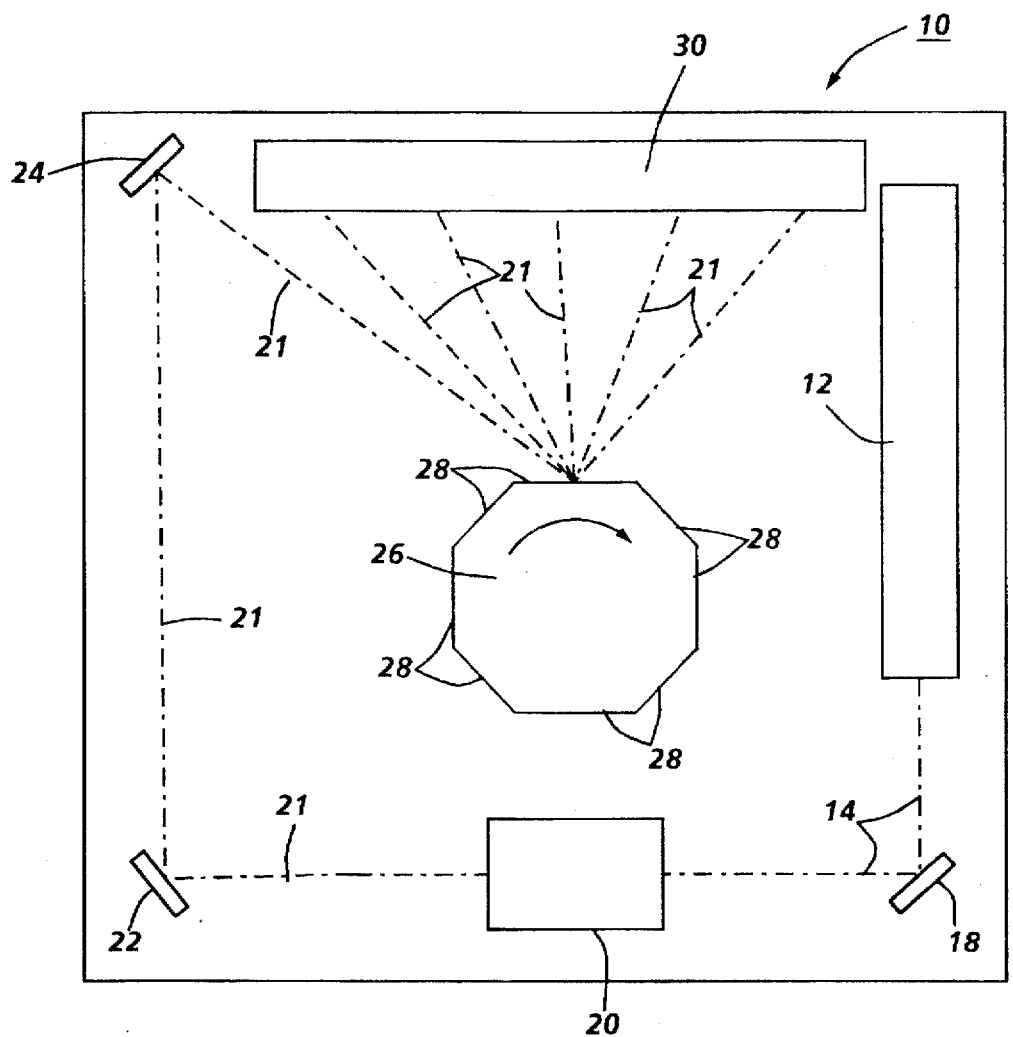
FIG. 1 is a schematic view of a raster output scanner incorporating a liquid crystal window for correcting the nonuniformity of the intensity of a light beam.

Referring to FIG. 1, there is shown a raster output scanner 10. A Helium Neon laser is used as a light source 12. The light source 12 emits a light beam 14 onto a mirror 18 which is used to reflect the light beam 14 onto an acousto-optic modulator 20.

The acousto-optic modulator 20 (hereinafter referred to as modulator) receives the light beam 14 from the mirror 18 and the pixel information for the line under scan from a data memory (not shown). Using the pixel information, the modulator 20 modulates the light beam to produce a modulated light beam 21. Then the modulated light beam 21 is sent out to a mirror 22 which in turn reflects the light beam 21 onto another mirror 24 and mirror 24 reflects the light beam 21 onto a rotating polygon 26 which has a plurality of facets 28 for receiving the light beam 21. The light beam 21 is scanned by the polygon 26 in a straight line onto a liquid crystal output window 30.

Figure 2:
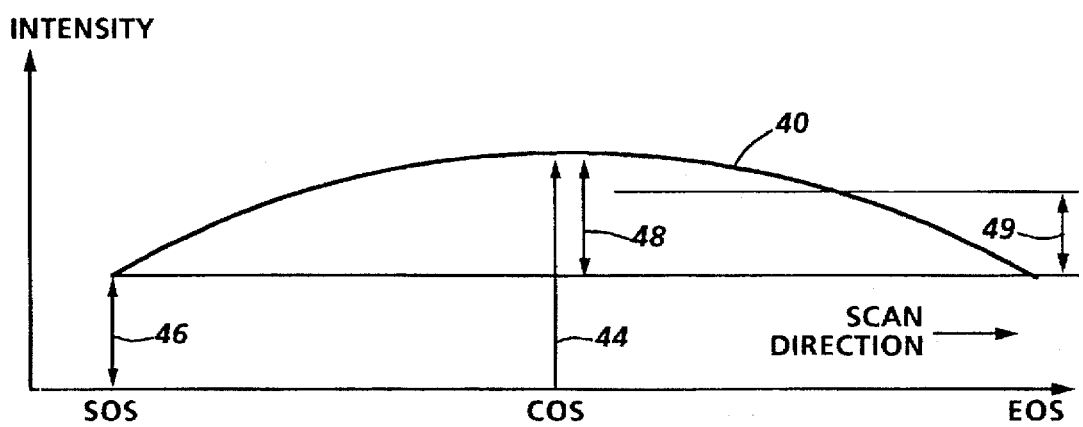
FIG. 2 is a plot of the nonuniformity of the intensity of the light beam.

The light beam 21 passes through the liquid crystal output window 30 and strikes a photoreceptor (not shown). The output window is wide enough to encompass the scanning of the light beam over one scan line. If the intensity of the light beam 21 at different locations is measured at the input of this window 30, the result will be a curve 40 shown in FIG. 2. Referring to FIG. 2, the vertical axis represents the intensity and the horizontal axis represents the scan direction. As it is observed, the intensity of the light beam at the start of scan line (SOS) and at the end of scan line (EOS) is less than the intensity of the light beam at the center of scan (COS). As the light beam 21 moves away from the start of the scan line and moves towards the center of the scan line, the intensity increases and as the light beam 21 moves away from the center of the scan line toward the end of the scan line, the intensity decreases. For example, the intensity at SOS and EOS is 1.3 mW, but the intensity at COS is 1.4 mW. The nonuniformity of the intensity of the light beam is called "roll off". The main contributor to the "roll off" is the modulator 20 and the rest of the elements between the modulator 20 and the output window 30 add to the problem.

Referring to FIG. 2, the "roll off" problem grows as the intensity variation 48 (the difference between the highest intensity 44 and the lowest intensity 46) becomes larger. If the intensity variation 48 becomes more than a maximum allowed intensity variation 49, then the difference between the lowest intensity and the highest intensity will be observed on a printed document. For example, if the intensity variation becomes more than a certain percentage (12%) of the lowest intensity the printed material will have lighter print at the edges of the document and darker prints at the center of the document. Therefore, in manufacturing, the intensity variation is the primary determining factor for rejecting the modulators. Any modulator with an intensity variation of more than the maximum allowed intensity variation will be rejected. In this embodiment an example of 12% is used, but it should be understood that different Raster output scanners have different intensity variation requirements.

This invention has overcome the "roll off" problem by using either a device which eliminates the intensity variation or a device which reduces the intensity variation to within permissible limits.

The preferred embodiment of this invention eliminates the intensity variation by applying a variable attenuation to the intensity of the light beam. By applying no attenuation to the light beam at the start and the end of the scan line and by increasing the attenuation gradually to offset the intensity variation as the intensity of the light beam increases and by decreasing the attenuation gradually to offset the intensity variation as the intensity of the light beam decreases, a light beam with a uniform intensity can be generated. Different devices can be used to accomplish this result. The preferred device in this embodiment is a liquid crystal window. Since the cells of the liquid crystal can be addressed individually by means well known in the art, a variable attenuation to match the curve of the light beam intensity, generated by the ROS, can be effected.

Figure 3:
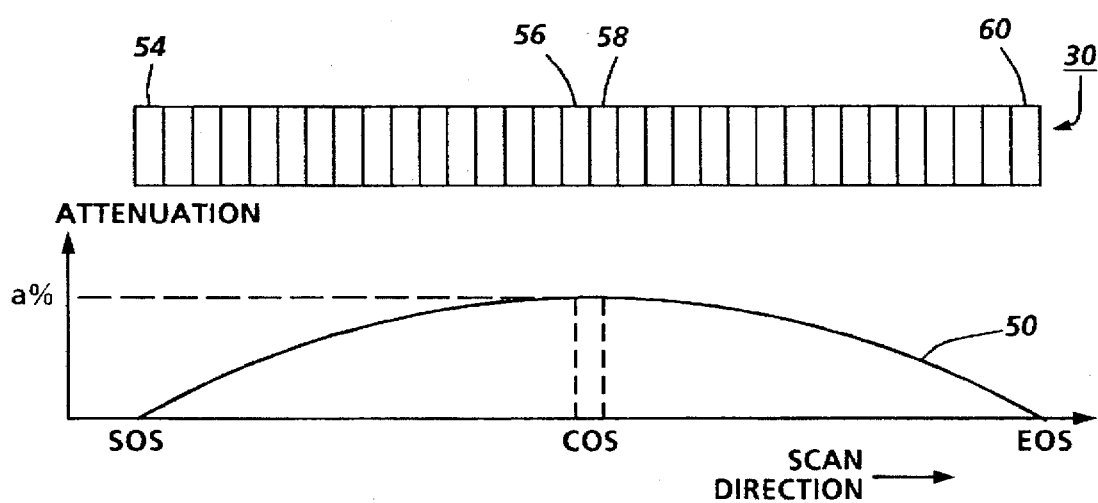
FIG. 3 is a view of a liquid crystal window and a plot of a corresponding attenuation curve.

The preferred embodiment is represented in FIG. 3, where the vertical axis represents the attenuation and the horizontal axis represents the scan direction. The liquid crystal window 30 can be controlled to have a variable attenuation such as attenuation curve 50. Each cell on the liquid crystal window corresponds to the respective portion of curve 50. For example, cells 54 and 60 have zero attenuation and cells 56 and 58 have the maximum attenuation (a %). The cells closer to the center of scan line COS have higher attenuation and the cells closer to the start of the scan line SOS or closer to the end of the scan line EOS have lower attenuation. The maximum attenuation a % is a function of the difference between the highest intensity and the lowest intensity.

Figure 4:
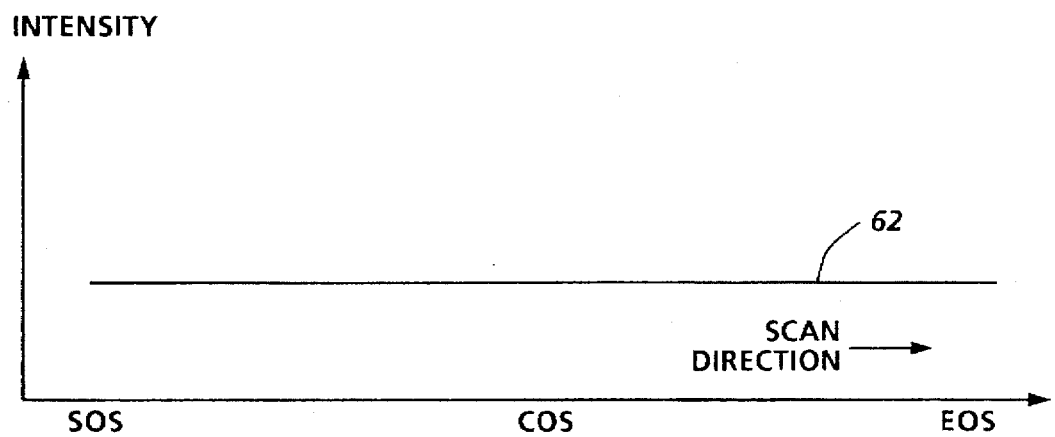
FIG. 4 is a plot of the intensity of the emerging light beam from the liquid crystal window of FIG. 3.

When the light beam with intensity curve 40, shown in FIG. 2, passes through the liquid crystal window 30, each cell applies an attenuation to offset the variation in intensity of the light beam received by that cell. Referring to FIG. 4, the light beam emerging from the liquid crystal window will have a uniform intensity 62 equal to the lowest intensity 46 of the curve 40 (FIG. 2).

Depending on the modulator used in a raster output scanner the light beam will have a different intensity curve unique to that modulator. Having a liquid crystal window 30 placed down stream of the scanning polygon 26 provides a proper way of adjusting the intensity as needed. Therefore, each individual cell on the liquid crystal window can be adjusted to attenuate the intensity of the light beam specific to the modulator used in that raster output scanner.

Figure 5:
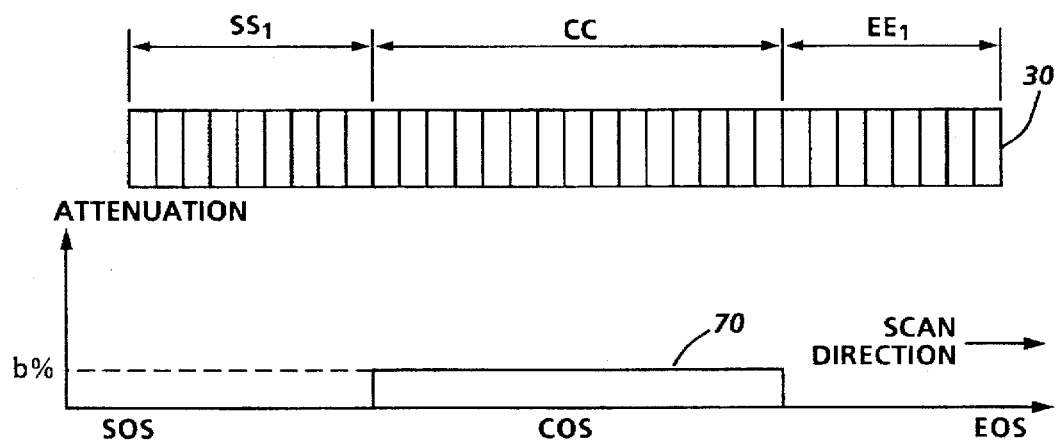
FIG. 5 is a view of a liquid crystal window and a plot of a corresponding attenuation curve.

An alternative to the preferred embodiment is to use a liquid crystal window with a flat level of attenuation to generate an intensity curve with an intensity variation within the maximum allowable range of the intensity variation. Referring to FIG. 5, the cells in area CC (center) of the liquid crystal 30, which receive a light beam with higher intensity, all are controlled to attenuate at the same rate (b %), as shown on attenuation curve 70. The attenuation of the outmost cells $SS_1$ and $EE_1$ are shut off. Since, in this approach, the intent is to reduce rather than eliminate the intensity variation, the attenuation (b %) is less than the attenuation (a %) used in the preferred embodiment which eliminates the intensity variation.

Figure 6:
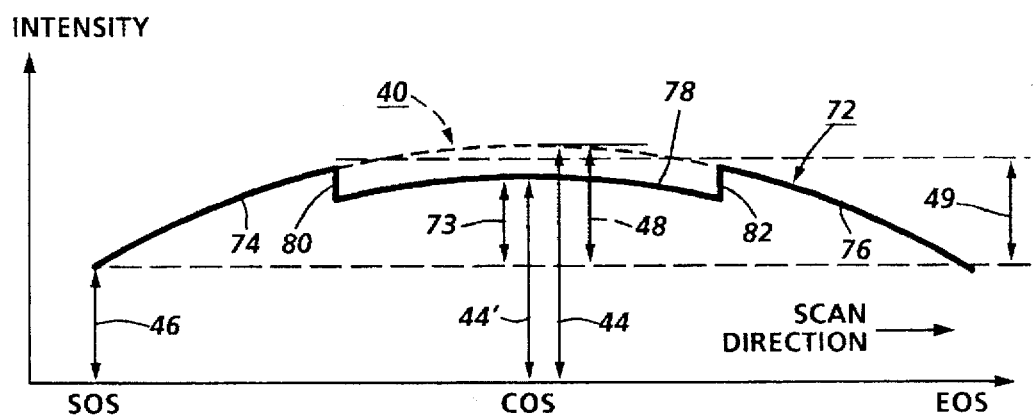
FIG. 6 is a plot of the intensity of the emerging light beam from the liquid crystal window of FIG. 5.

Referring to FIGS. 5 and 6, when the light beam with intensity curve 40, which has an intensity variation 48 higher than the required intensity variation 49, passes through the liquid crystal window 30 (FIG. 5), the cells apply only one level (b %) of attenuation to the intensity of the light beam. Therefore, referring to FIG. 6, the light beam emerging from the liquid crystal window will have an intensity curve 72. The segments 74 and 76, which correspond to the cell areas $SS_1$ and $EE_1$ (FIG. 5) respectively, receive zero attenuation and segment 78, which correspond to cell area CC, receives b % attenuation. The intensity variation 73 (difference between the highest intensity 44' and the lowest intensity 46) is less than the intensity variation 48 (difference between the highest intensity 44 and the lowest intensity 46) of the unattenuated intensity curve 40. In contrast to the intensity variation 48 of the unattenuated curve 40 which is more than the required intensity variation 49, the intensity variation 73 of the attenuated curve 72 is within the maximum allowable range of the intensity variation 49.

The transition from zero attenuation to the maximum attenuation causes the two large jumps 80 and 82 on the intensity curve 72 which, in some instances, can be visible on the printed document as a sudden change from a dark print to a lighter print. Therefore, it may be desirable to eliminate the large jumps 80 and 82 and have several smaller jumps instead.

Figure 7:
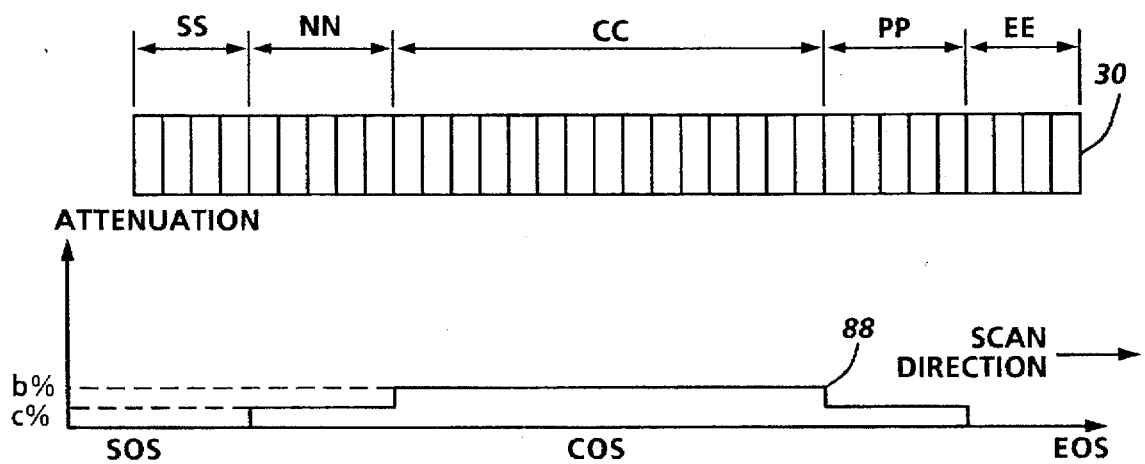
FIG. 7 is a view of a liquid crystal window and a plot of a corresponding attenuation curve.

To eliminate the jumps 80 and 82, a second level of attenuation is needed. Referring to FIG. 7, by having a second attenuation level in the areas of NN and PP, a curve 90 (shown in FIG. 8) with smoother jumps is created. This approach uses two flat levels of attenuation to generate an intensity curve with less intensity variation. The cells in area CC of the liquid crystal 30, which receive a light beam with higher intensity, all attenuate at the same rate (b %), as shown on attenuation plot 88. The attenuation of the outmost cells $SS_1$ and $EE_1$ are shut off. The cells in the areas NN and PP all attenuate at the same rate (c %), but the amount of their attenuation is less than the amount of attenuation in area CC (b %).

Figure 8:
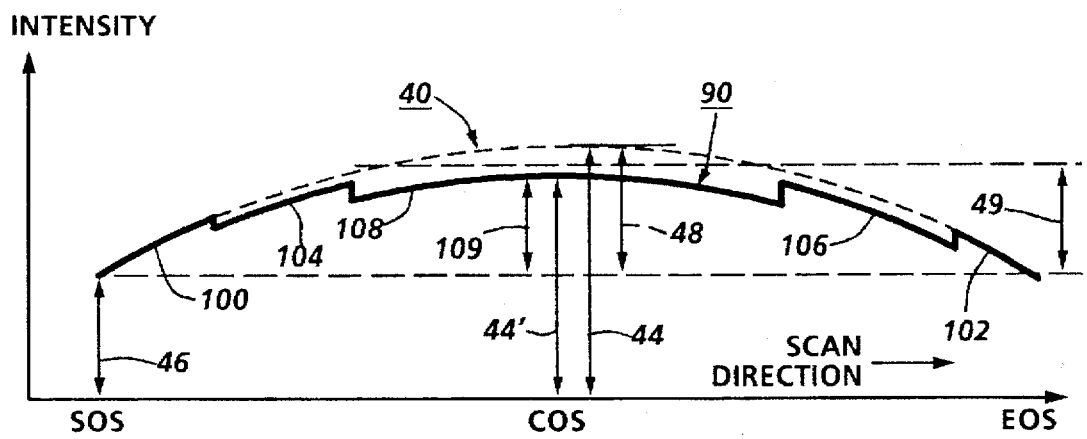
FIG. 8 is a plot of the intensity of the emerging light beam from the liquid crystal window of FIG. 7.

Referring to FIGS. 7 and 8, when the light beam with an intensity curve 40, which has an intensity variation 48 higher than the required intensity variation 49, passes through the liquid crystal window 30, the cells apply two levels of attenuation to the intensity of the light beam. As a result, the emerging light beam from the liquid crystal window 30 has an intensity curve 90, shown in FIG. 8. The intensity curve 90 has several segments. Segments 100 and 102, which correspond to the cell areas SS and EE respectively, receive no attenuation. Segments 104 and 106, which correspond to cells in the areas NN and PP respectively, receive c % attenuation and segment 108, which corresponds to cell area CC receive b % attenuation. The attenuated intensity curve 90 has an intensity variation 109 which is within the required range of intensity variation 49.

By using a liquid crystal window in this manner and placing it at the output window, the light beam coming from any ROS which has an intensity curve with an intensity variation higher than the rejection intensity variation can be modified to have a maximum variation which is less than the rejection intensity variation. Consequently, all the modulators with an intensity variation which would be rejected for use in a ROS may now be used.

Figure 10:
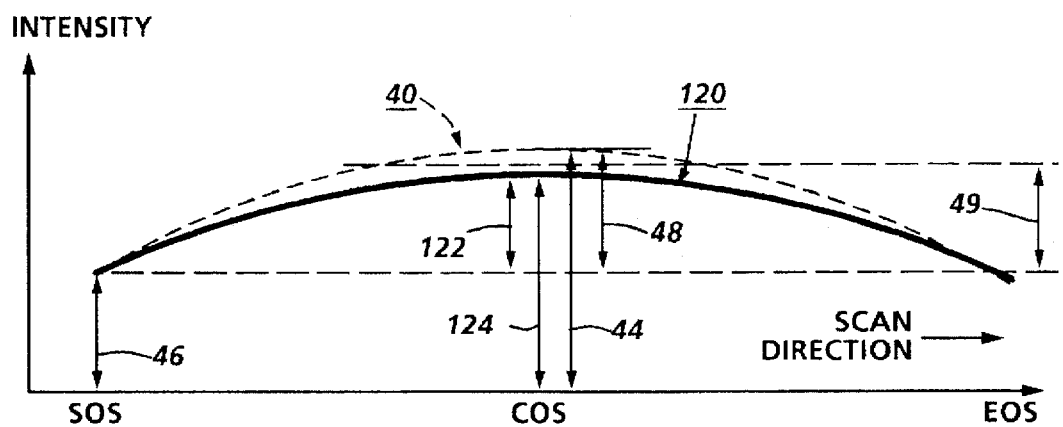
FIG. 10 is a plot of the intensity of the emerging light beam from the neutral density filter of FIG. 9.
Figure 9:
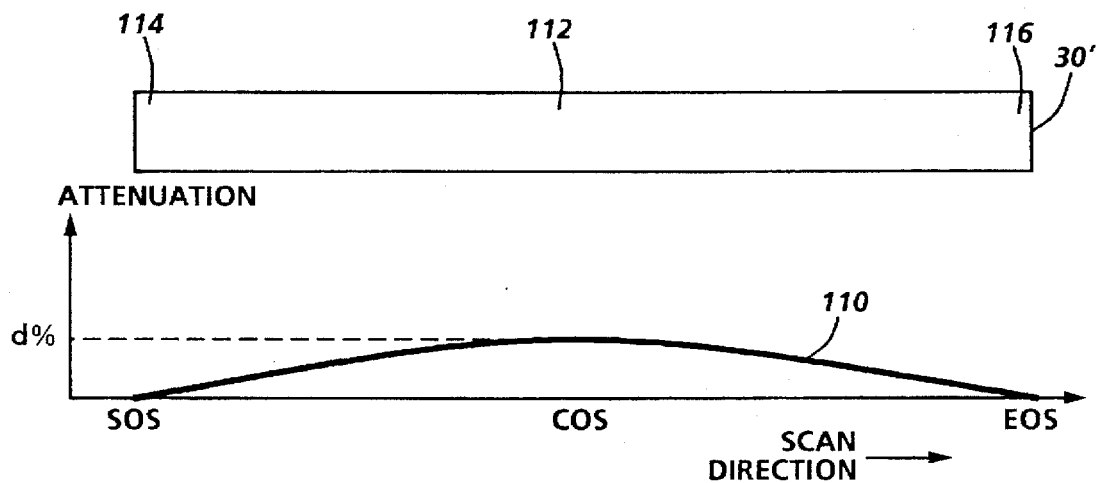
FIG. 9 is a view of a neutral density filter and a plot of a corresponding attenuation curve.

A cost effective alternative is to use a neutral density filter instead of the liquid crystal window. Referring to FIG. 9, a neutral density filter 30' can be made to have certain attenuation curve 110. The filter 30' will have its maximum attenuation (d %) at the center 112 of the filter 30'. By moving away from the center 112 in both directions, the attenuation will gradually decrease until the attenuation becomes zero at both ends 114 and 116 of the filter 30'. Referring to FIG. 10, when a light beam with an intensity variation 48 which is higher than the required intensity variation 49 passes through the neutral density filter 30', a light beam with an intensity curve 120 exits the filter 30'. The emerging beam has an intensity variation 122 (difference between the highest intensity 124 and the lowest intensity 46) which is in the required range of the intensity variation 49.

In Contrast, to the attenuation of the liquid crystal window of the preferred embodiment which can be adjusted for any intensity curve of the beam, coming from any ROS, the neutral density filter 30' has a preset attenuation curve. However, the neutral density filter 30' can reduce the intensity variation to an intensity variation which is in the required range of the intensity variation. Again this approach provides a way to use the modulators with an intensity variation of more than the required intensity variation, which would otherwise be rejected.

It should be noted that the method used in this invention for correcting or reducing the nonuniformity of the intensity of the light beam caused by a modulator can also be used to correct or reduce any nonuniformity of the intensity of the light beam caused by ROS optics when a modulator is not utilized in the ROS system. It should also be noted that any nonuniformity of the light beam with any kind of curvature, other than the one shown in the drawings, caused by any ROS with or without a modulator can be reduced or corrected using the method disclosed in this embodiment. Furthermore, it should be understood that the Helium Neon laser, disclosed in this invention as a light source, can be replaced by any kind of light source.

What is claimed is:

1. A raster output scanner comprising:

a light source emitting a light beam;

variable reducing means for reducing beam intensity variation;

a scanning means arranged to receive said beam from said light source and scan said beam across said variable reducing means; and said light beam from said scanning means having an intensity variation over one scan line, whereby said variable reducing means reduces the beam intensity by varying amounts across the scan line.

2. The structure as recited in claim 1, wherein said beam intensity variation is above a given level and said variable reducing means reduces the intensity variation to an intensity variation below said given level.

3. The structure as recited in claim 2, wherein said variable reducing means substantially eliminates the intensity variation of said beam to generate a generally uniform beam intensity.

4. The structure as recited in claim 1, wherein said variable reducing means is a liquid crystal window having a plurality of cells which individually are controlled to attenuate the intensity of said scanning beam along a scan line as needed.

5. The structure as recited in claim 1, wherein said variable reducing means is a neutral density filter.

6. The structure as recited in claim 1, further comprising:

light modulating means positioned at the path of said light beam between said light source and said scanning means for modulating said light beam received by said scanning means.

7. The structure as recited in claim 6, wherein said beam intensity variation is above a given level and said variable reducing means reduces the intensity variation to an intensity variation below said given level.

8. The structure as recited in claim 7, wherein said variable reducing means substantially eliminates the intensity variation of said beam to generate a generally uniform beam intensity.

9. The structure as recited in claim 6, wherein said variable reducing means is a liquid crystal window having a plurality of cells.

10. The structure as recited in claim 6, wherein said variable reducing means is a neutral density filter.

* * * * *